(12) United States Patent
Ureten et al.

(10) Patent No.: US 9,584,251 B2
(45) Date of Patent: Feb. 28, 2017

(54) SYSTEM AND METHOD FOR CLASSIFYING SIGNAL MODULATIONS

(71) Applicant: Allen-Vanguard Corporation, Ottawa (CA)

(72) Inventors: Oktay Ureten, Ottawa (CA); Trevor Noel Yensen, Ottawa (CA)

(73) Assignee: Allen-Vanguard Corporation, Ottawa (CA)

( * ) Notice: Subject to any disclaimer, the term of this patent is extended or adjusted under 35 U.S.C. 154(b) by 0 days.

(21) Appl. No.: 15/086,414

(22) Filed: Mar. 31, 2016

(65) Prior Publication Data

US 2016/0294504 A1 Oct. 6, 2016

Related U.S. Application Data

(60) Provisional application No. 62/140,863, filed on Mar. 31, 2015.

(51) Int. Cl.
*H04B 1/16* (2006.01)
*H04K 3/00* (2006.01)
*H04L 27/00* (2006.01)

(52) U.S. Cl.
CPC ........... *H04K 3/44* (2013.01); *H04L 27/0012* (2013.01); *H04L 27/0014* (2013.01); *H04L 2027/0026* (2013.01)

(58) Field of Classification Search
CPC ...................................................... H04K 3/44
USPC ......................................................... 455/228
See application file for complete search history.

(56) References Cited

U.S. PATENT DOCUMENTS

| 6,714,605 | B2 * | 3/2004 | Sugar | H04W 16/14 375/224 |
|---|---|---|---|---|
| 7,428,270 | B1 * | 9/2008 | Dubuc | H04L 27/0012 375/224 |
| 2007/0058753 | A1 * | 3/2007 | Saavedra | H03D 3/26 375/329 |

FOREIGN PATENT DOCUMENTS

| CA | 2298316 | 8/2000 |
|---|---|---|
| WO | 0152493 | 7/2001 |

* cited by examiner

*Primary Examiner* — Sanh Phu
(74) *Attorney, Agent, or Firm* — Elan IP Inc.

(57) ABSTRACT

A method for pre-processing a signal prior to classification, where the signal includes non-contiguous segments; the method includes applying a coarse carrier frequency offset correction, applying a phase correction, applying a residual course frequency offset correction, and outputting a simulated continuous signal consisting of recorded continuous signal segments and modeled non-contiguous segments. A system for implementing the method is also disclosed.

12 Claims, 11 Drawing Sheets

|  | CW | AM | FSK | BPSK | MPSK/MQAM |
|---|---|---|---|---|---|
| CW | 100 | 0 | 0 | 0 | 0 |
| AM | 0 | 100 | 0 | 0 | 0 |
| 2FSK | 0 | 0 | 100 | 0 | 0 |
| 4FSK | 0 | 2 | 98 | 0 | 0 |
| MSK | 0 | 0 | 100 | 0 | 0 |
| BPSK | 0 | 0 | 0 | 100 | 0 |
| QPSK | 0 | 0 | 0 | 0 | 100 |
| 8PSK | 0 | 0 | 0 | 0 | 100 |
| PI4QPSK | 0 | 0 | 0 | 0 | 100 |
| 16QAM | 0 | 0 | 0 | 0 | 100 |

Figure 10

SYSTEM AND METHOD FOR CLASSIFYING SIGNAL MODULATIONS

TECHNICAL FIELD

This invention relates generally to signal classification. More specifically it relates to an automatic modulation recognition system to classify signal modulations using signal samples acquired from non-contiguous observations.

BACKGROUND

Automatic modulation recognition (AMR) is an integral function of electronic support (ES) systems in exploiting electromagnetic emissions, performing threat analysis, and managing electronic attack (EA) to construct effective jamming waveforms. The AMR also has applicability in civilian applications such as civilian spectrum monitoring and adaptive radio communication technologies.

Extensive prior art exists on automatic modulation recognition. An overview of existing techniques and their comparative analysis is given in Dobre, O. A.; Abdi, A.; Bar-Ness, Y.; Su, W., "*Survey of automatic modulation classification techniques: classical approaches and new trends,*" IET Communications, vol. 1, no. 2, pp. 137, 156, April 2007. More recent developments on extending AMR capabilities to newer signaling schemes such as multiple input multiple output (MIMO) systems such as in Miao Shi; Bar-Ness, Y.; Wei Su, "*STC and BLAST MIMO Modulation Recognition,*" IEEE GLOBECOM '07. Vol., no., pp. 3034, 3039, 26-30 Nov. 2007; improving AMR performance in low signal to noise rations, increasing modulation recognition reliability using distributed sensors such as by Xu, J. L.; Wei Su; MengChu Zhou, "*Distributed Automatic Modulation Classification With Multiple Sensors,*" IEEE Sensors Journal, vol. 10, no. 11, pp. 1779, 1785, November 2010; reducing the latency in making a decision as per Cardoso, C.; Castro, A. R.; Klautau, A., "*An Efficient FPGA IP Core for Automatic Modulation Classification,*" IEEE Embedded Systems Letters, vol. 5, no. 3, pp. 42-45, September 2013; and reducing computational complexity for efficient hardware implementations such as in Wei Su; Xu, J. L.; Meng Chu Zhou, "*Real-time Modulation Classification Based on Maximum Likelihood,*" IEEE Communications Letters, vol. 12, no. 11, pp. 801, 803, November 2008.

In each of these prior art references, and indeed in the prior art generally, modulation recognition relies on signal samples captured from contiguous observations, requiring a signal record that is collected without interruption in the acquisition, or data recording, process.

There are certain applications where data cannot be captured continuously; therefore gaps occur in between signal acquisitions. One application where modulation recognition has to rely on non-contiguous observations is responsive (reactive) jammers.

Conventional active radio-controlled improvised explosive device (RCIED) jammers continuously emit energy in predefined frequency bands as a precaution against trigger signals regardless of actual signal activities. Responsive jammers, on the other hand, scan the radio spectrum during look through windows and the available transmit energy is focused on currently relevant spectral areas.

Performing other activities in between jamming cycles creates further opportunities for more effective jamming: for example, knowledge of signal type can assist in allocating the most effective jamming waveform to the currently detected threat. Similarly, identification of a network type can be used to exploit vulnerabilities in a particular network for more effective jamming. Modulation recognition is an essential tool in identifying signals and network types.

Non-contiguous data frames are inevitable in several other applications of time divisive nature. For example, there is an emerging need to develop algorithms that will support interoperability requirements of various applications such as tactical communications (TC), electronic attack (EA), intelligence surveillance and reconnaissance (ISR) systems, and electronic support (ES) systems.

Signal samples captured over non-contiguous time frames contain abrupt amplitude and phase discontinuities at the frame transitions. Fourier transform generates distortions in the frequency spectrum when the transformed signals contain abrupt changes. These distortions in the spectrum affect the performance of preprocessing stages relying on frequency domain processing in an automatic modulation classifier such as frequency offset correction. Further, several modulation recognition features depend on spectral and phase characteristics of the signals and corrupted features degrade the performance of the classifier.

SUMMARY OF THE INVENTION

In one embodiment of the invention, there is provided a signal classifying unit including a processor, a signal receiver for receiving and recording radio-frequency signals; wherein the receiver is interruptible such that segments of the recorded radio-frequency signals are non-contiguous; a medium storing instructions executable by the processor for modeling the non-contiguous segments; wherein the instructions include instructions to: apply a coarse carrier frequency offset correction, apply a phase correction, apply a residual (fine) frequency offset correction, and, output a simulated continuous signal consisting of recorded continuous signal segments and modeled non-contiguous segments. The system optionally also includes a signal classifier receiving the outputted simulated continuous signal for classifying the simulated continuous signal.

In one aspect of this embodiment, the coarse carrier frequency offset correction comprises a windowing algorithm, a power spectrum estimation algorithm and a frequency shift detection algorithm.

In another aspect of this embodiment, the windowing algorithm applies a taper function to each frame of the recorded signal to suppress sudden amplitude changes at frame edges.

In another aspect of this embodiment, the phase correction comprises an algorithm implementing the rotation of phases of each sample in a frame such that leading and trailing samples of adjacent frames have contiguous phase.

In another aspect of this embodiment, the algorithm implementing the phase correction calculates the phase rotated samples y(n) by the following formulae:

$$y(n) = x(n)e^{-j\Phi(\lfloor \frac{n}{w+1}+1 \rfloor)}$$

where $\lfloor \; \rfloor$ is the floor operator that maps its argument to the largest integer less than or equal to the argument, x(n) is the input signal containing discontinuities, n=1, . . . , N and N=mw is the total number of samples in m frames, w is the length of each non-contiguous frame. The phase correction to be applied to frame (k+1) is Φ(k+1), which is computed by $$\Phi(k+1) = \Phi(k) + \phi(kw+1) - \phi(kw)$$

where k=1, ..., m is the frame number, m is the total number of concatenated frames and $$\varphi(\cdot) = \tan^{-1}\left(\frac{\mathrm{Im}(x(\cdot))}{\mathrm{Re}(x(\cdot))}\right)$$

is the phase angle of sample x(n) and $\Phi(1) = \phi(1)$ by definition.

In another aspect of the invention, the residual frequency offset is estimated using phase-rotated samples.

According to a second embodiment of the invention, there is provided a method for pre-processing a signal prior to classification, where the signal includes non-contiguous segments; the method including applying a coarse carrier frequency offset correction, applying a phase correction, applying a residual frequency offset correction, and outputting a simulated continuous signal consisting of recorded continuous signal segments and modeled non-contiguous segments.

In one aspect of the second embodiment, the coarse carrier frequency offset correction comprises a windowing algorithm, a power spectrum estimation algorithm and a frequency shift detection algorithm.

In another aspect of the second embodiment, the windowing algorithm applies a taper function to each frame of the recorded signal to suppress sudden amplitude changes at frame edges.

In another aspect of the second embodiment, the phase correction comprises an algorithm implementing the rotation of phases of each sample in a frame such that leading and trailing samples of adjacent frames have contiguous phase. In another aspect of this embodiment, the algorithm implementing the phase correction calculates the phase rotated samples y(n) by the following formulae:

$$y(n) = x(n)e^{-j\Phi\left(\left\lfloor \frac{n}{w+1} + 1 \right\rfloor\right)}$$

where $\lfloor \ \rfloor$ is the floor operator that maps its argument to the largest integer less than or equal to the argument, x(n) is the input signal containing discontinuities, n=1, ..., N and N=mw is the total number of samples in m frames, w is the length of each non-contiguous frame. The phase correction to be applied to frame (k+1) is $\Phi(k+1)$, which is computed by $$\Phi(k+1) = \Phi(k) + \phi(kw+1) - \phi(kw)$$

where k=1, ..., m is the frame number, m is the total number of concatenated frames and $$\varphi(\cdot) = \tan^{-1}\left(\frac{\mathrm{Im}(x(\cdot))}{\mathrm{Re}(x(\cdot))}\right)$$

is the phase angle of sample x(.) and $\Phi(1) = \phi(1)$ by definition.

In another aspect of the second embodiment, the residual course frequency offset is estimated using phase rotated samples.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 10 is a table of example test data summarizing classification results; and

DETAILED DESCRIPTION OF THE INVENTION

A classifier unit in an embodiment of the invention generally includes a processor for executing computer executable instructions for modeling non-contiguous segments, a storage medium for storing the executable instructions, and a receiver for receiving and recording non-contiguous radio frequency signals. The elements are preferably implemented on an FPGA, but the teachings of the invention are readily adaptable or implementable with the use of a variety of computer systems.

The signal classifier unit is capable of classifying non-contiguous observations using automatic modulation recognition which broadly consist of a coarse frequency estimation, phase correction (or phase rotation), and a residual frequency offset correction.

To begin, the following observations and characterizations are discussed regarding non-contiguous portions of a signal.

In some applications, such as those using time-division-multiplexing (TDM) solutions for creating interoperability between two or more functionalities in a transceiver, the spectrum band is shared between multiple applications at different times. The nature of the applications interoperating in TDM fashion imposes different restrictions on system design. For instance, radio communications could be a cooperative application where both receive and transmit functions can be coordinated between a receiver and a transmitter. A major concern in this type of implementation is the latency due to duplexing.

Another interoperability application is one where the receive capabilities are shared between two functionalities, such as electronic support and signal detection. Here, the problems differs slightly in that the applications are non-cooperating where the intention is to intercept communication from an entity over which no control can be imposed. This results in an undesired interruption in data acquisition, as it is altogether unknown when the interruption will occur.

The interruptions in between receive cycles can be large depending on the specific applications involved, or switched between. For example, in responsive jamming the receiver only captures data during look through periods of a blanking sequence and transmit windows need to be much longer than the receive windows to ensure threats are defeated.

Figure 1:
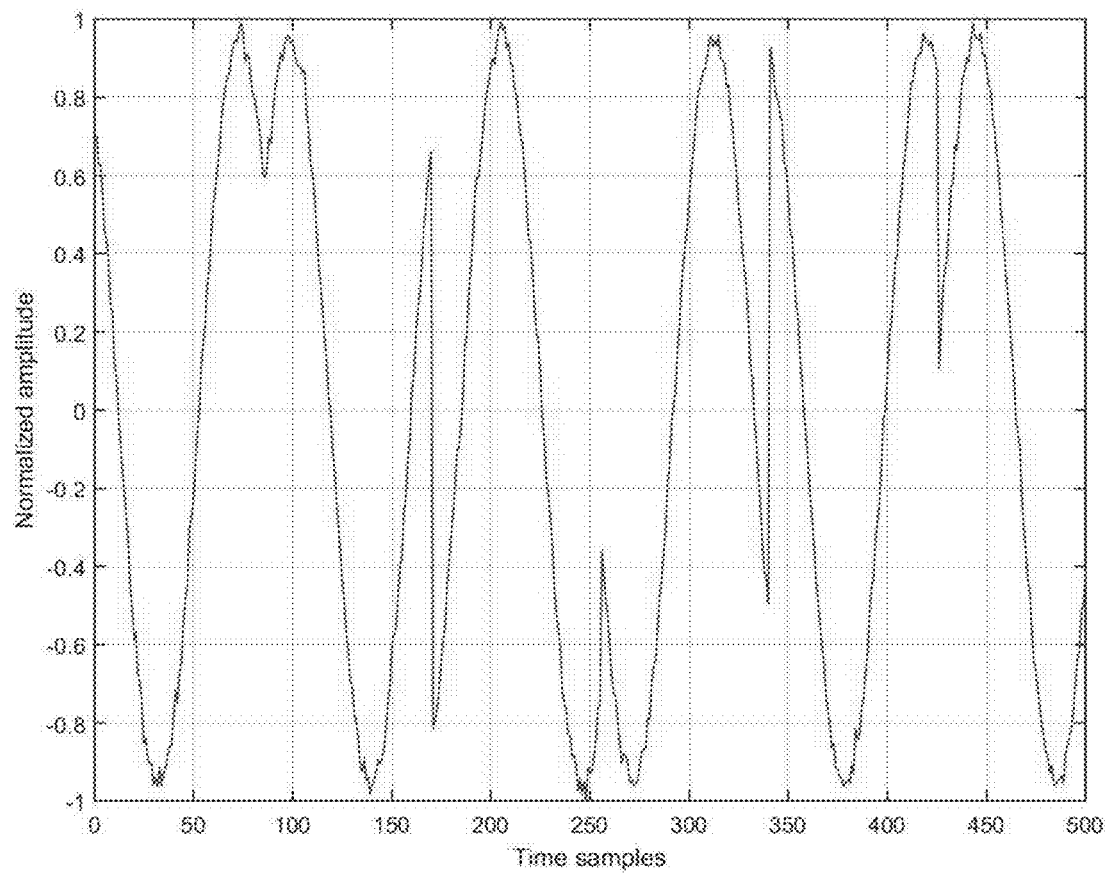
FIG. 1 is a plot of an example in-phase component of a noisy continuous wave (CW) signal captured over non-contiguous time frames showing abrupt changes at frame transitions.

Referring now the FIG. 1, there is shown one visual representation of non-contiguous signal samples (which will be contrasted with an example further below). In the example of FIG. 1, samples of the in-phase component of a continuous wave signal received over non-contiguous time intervals are shown. Assuming small receive intervals followed by larger silence periods, the receiver captures only portions of the signal and there are missing samples.

The number of samples required for successful modulation recognition depends on several signal and channel parameters such as bandwidth and signal-to-noise ratio. If a sufficient number of samples can be acquired within a single short receive window, then modulation recognition can be performed in the usual way. Problems arise if a number of non-contiguous receive frames needed to be accumulated when the number of samples in a single receive window is insufficient.

Figure 2:
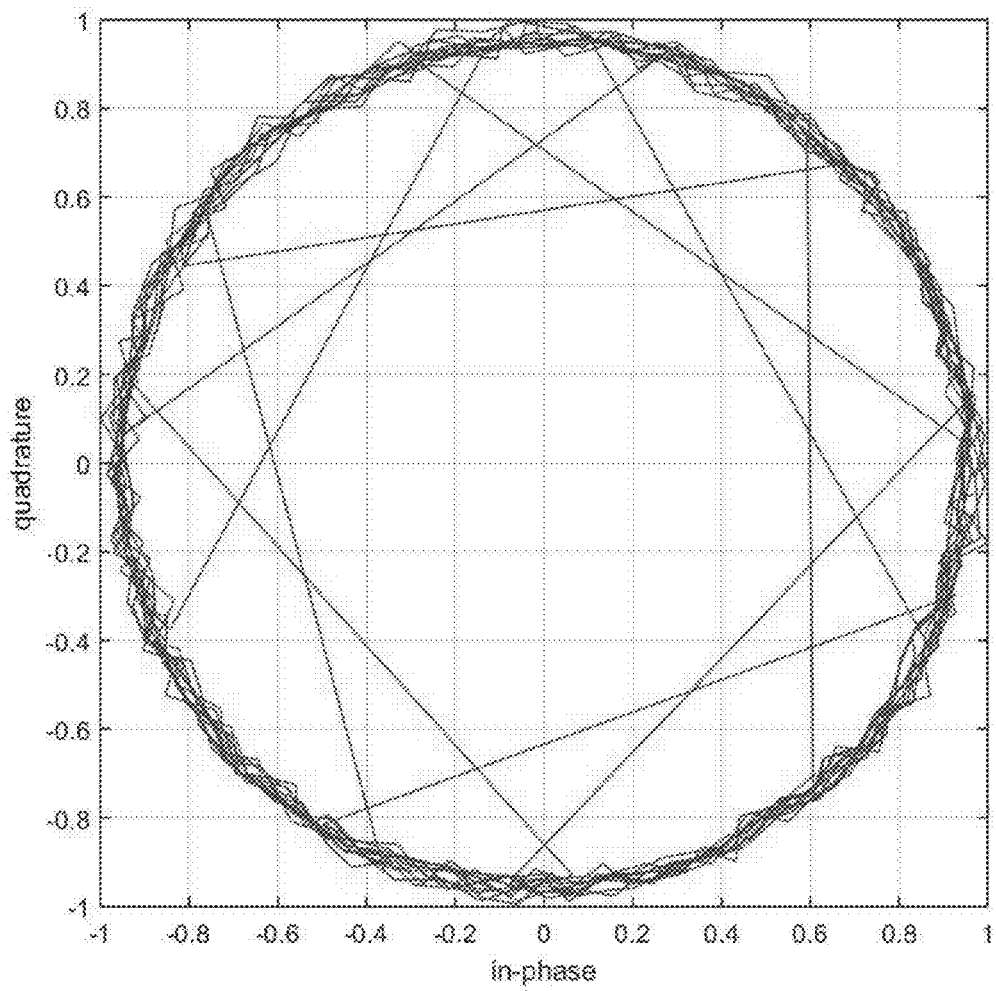
FIG. 2 shows the complex (in-phase and quadrature) samples of the captured signal in FIG. 1, showing the cords resulted from sudden frame transitions.

Referring now to FIG. 2, the complex (in-phase and quadrature) samples of the captured signal in FIG. 1 are shown. Phase jumps at frame transitions are clearly noticeable in the form of cords.

Figure 3:
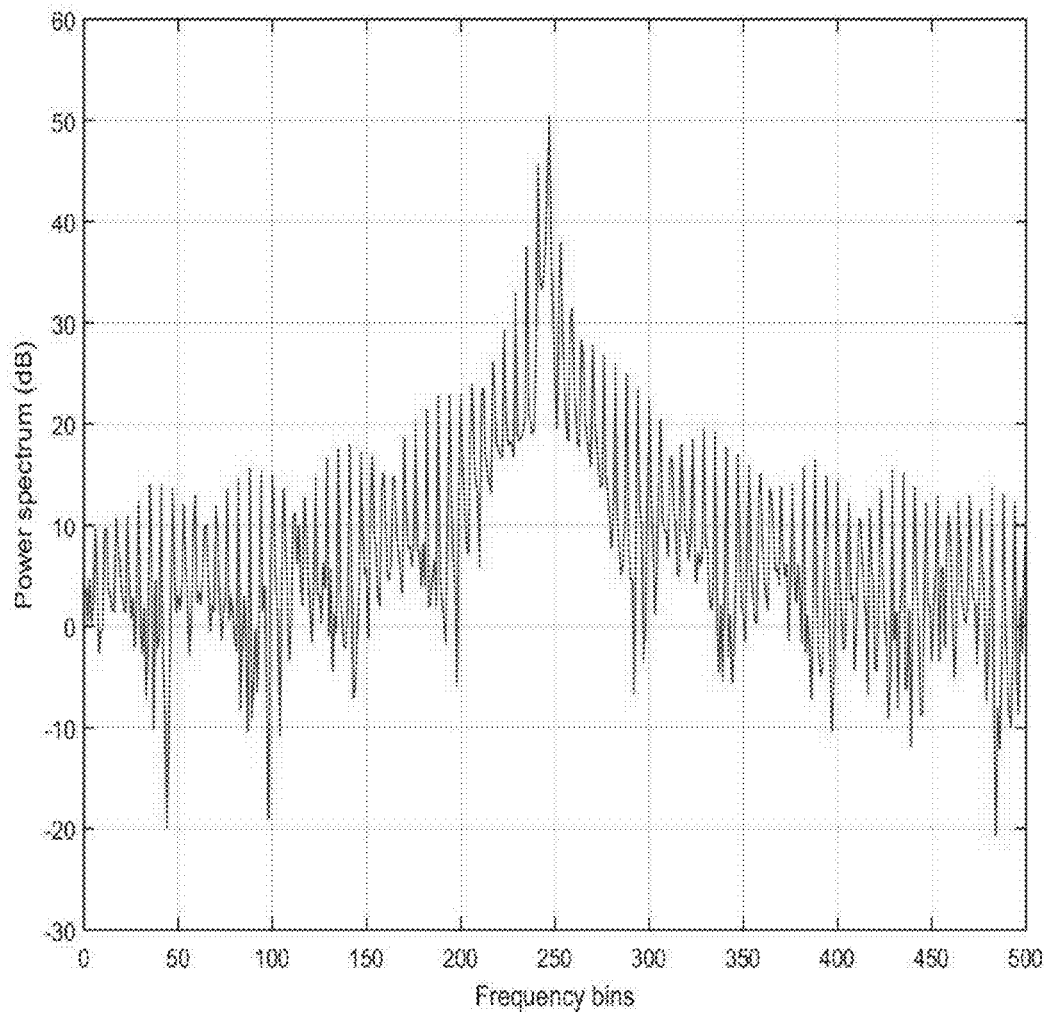
FIG. 3 shows a power spectrum of non-contiguous signal in FIG. 2, showing significant spurs and poor sidelobe behavior.

Referring now to FIG. 3, a power spectrum of the non-contiguous signal displayed in FIG. 2 is shown. As seen from these plots, the spectrum of the non-contiguous signal is contaminated with spurs and has poor increased sidelobes. These spurs and high sidelobe levels destroy features and they deteriorate the performance of the frequency offset estimator, leading to degraded modulation recognition performance.

Feature-Based Modulation Recognition

There are well-recognized signal features used for modulation recognition. These features include spectral-based, wavelet-based, higher order statistics, and cyclic features. Spectral features exploit unique spectral characteristics of different signal modulations in three key signal aspects: amplitude, phase, and frequency. Since different signal modulations exhibit different properties in their amplitude, phase, and frequency, a complete pool of modulation candidates is broken down to sets and subsets which can be discriminated with the most effective features. The present invention focuses on spectral based features, particularly due to lower computational requirements.

Figure 4:
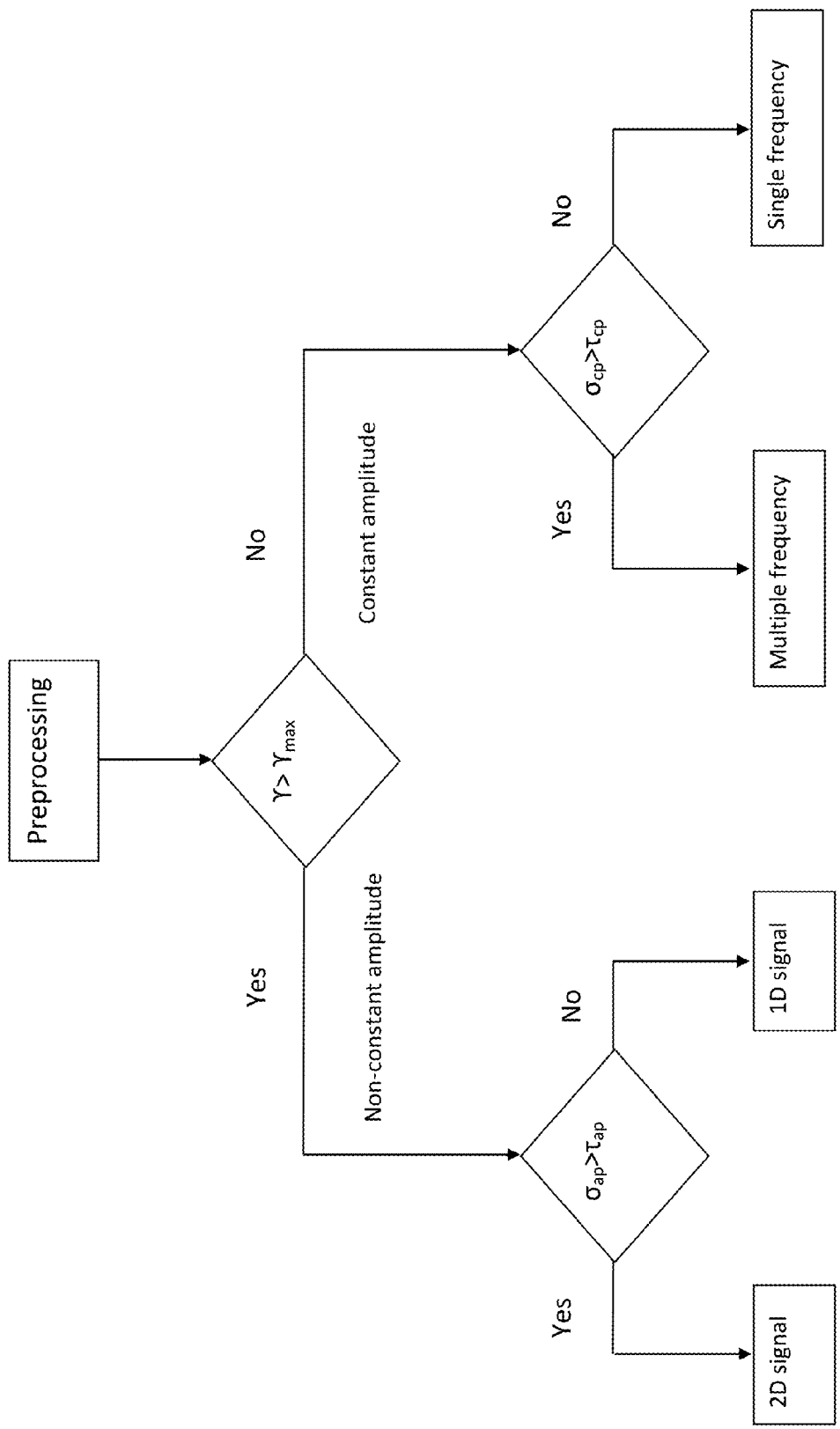
FIG. 4 shows a typical decision tree for automatic modulation recognition.

Referring now to FIG. 4, a typical example of a decision tree used for modulation recognition is shown. This type of decision consists of nodes of sequential tests dedicated by different features and it is often used to give a clear guideline for a classification procedure. The decision tree differentiates between various modulation types. The decisions are made by comparing calculated amplitude, phase, and frequency features and comparing them to known threshold values.

With reference to the definitions in FIG. 4, the measured features are $\gamma$, $\sigma_{ap}$, $\sigma_{cp}$ which are given by:

$$\gamma = \max \frac{|X(k)|^2}{N}$$

where X(k) is the discrete Fourier transform (DFT) of $$x(n) = \frac{r(n)}{\frac{1}{N}\sum_{n=1}^{N} r(n)} - 1$$

and r(n) are received signal samples.

$\sigma_{ap}$ and $\sigma_{cp}$ are the standard variations of absolute and continuous phases which are defined as:

$$\phi_{ap} = \tan^{-1}\frac{|Q(t)|}{|I(t)|}$$

$$\phi_{cp} = \tan^{-1}\frac{Q(t)}{I(t)}$$

The first step determines whether the modulation is constant amplitude (such as in constant wave, fixed modulation and frequency-shift keying signal schemes) or non-constant amplitude (such as in amplitude modulation, phase-shift keying and quadrature amplitude modulation arrangements) by comparing computed $\gamma$ value to a threshold. Constant amplitude signals result in very low $\gamma$ values. For example, the determination may be to check whether $\gamma$ is greater than $\gamma_{max}$, and if so then the modulation may have a non-constant amplitude, otherwise the modulation may have a constant amplitude.

In the second step, absolute phase variances are compared to classify non-constant amplitude modulation as either 1D or 2D, or to classify constant amplitude modulation as single frequency or multiple frequency.

The $\gamma$ metric is very robust to frequency offsets, whereas the $\sigma ap$ and $\sigma cp$ are sensitive to frequency offsets. Even a small frequency offset can generate large phase changes over time causing the variance to become high. When there is a frequency offset, absolute and direct phases will have increasing profiles over time with a slope proportional with the frequency offset. This will increase the variance of features and will result in misclassification of 1D signals as 2D signals.

Removing frequency shifts requires an accurate estimate of the offset. Because there is no a priori information (known preambles or pilot tones) available about the waveform before modulation recognition is performed, a blind frequency estimation algorithm is needed.

The issues raised due to the non-contiguous nature of observations may be addressed during the pre-processing rather than modifying classification features. This approach may eliminate the need to design a new modulation classifier and therefore may be easily integrated into existing legacy AMR systems.

Figure 5:
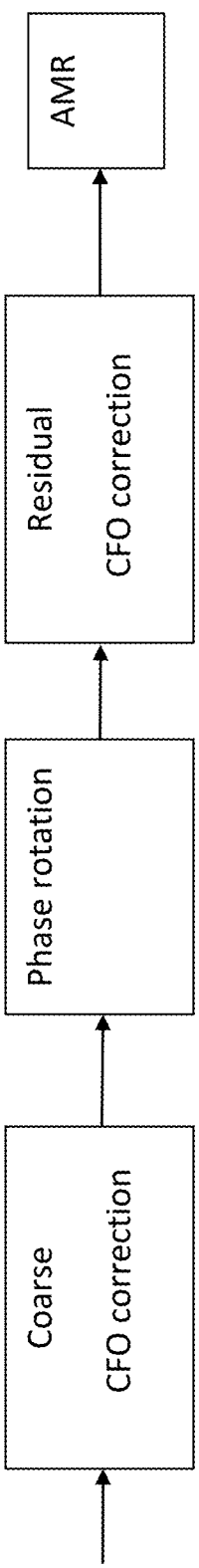
FIG. 5 is a block diagram of the pre-processing technique according to one embodiment of the invention.

Referring now to FIG. 5, the preferred embodiment of the invention involves three main stages of pre-processing: i) a coarse carrier offset frequency offset correction, ii) phase correction, and iii) residual carrier frequency offset correction being implemented prior to AMR taking place.

Coarse Frequency Offset Correction

Figure 6:
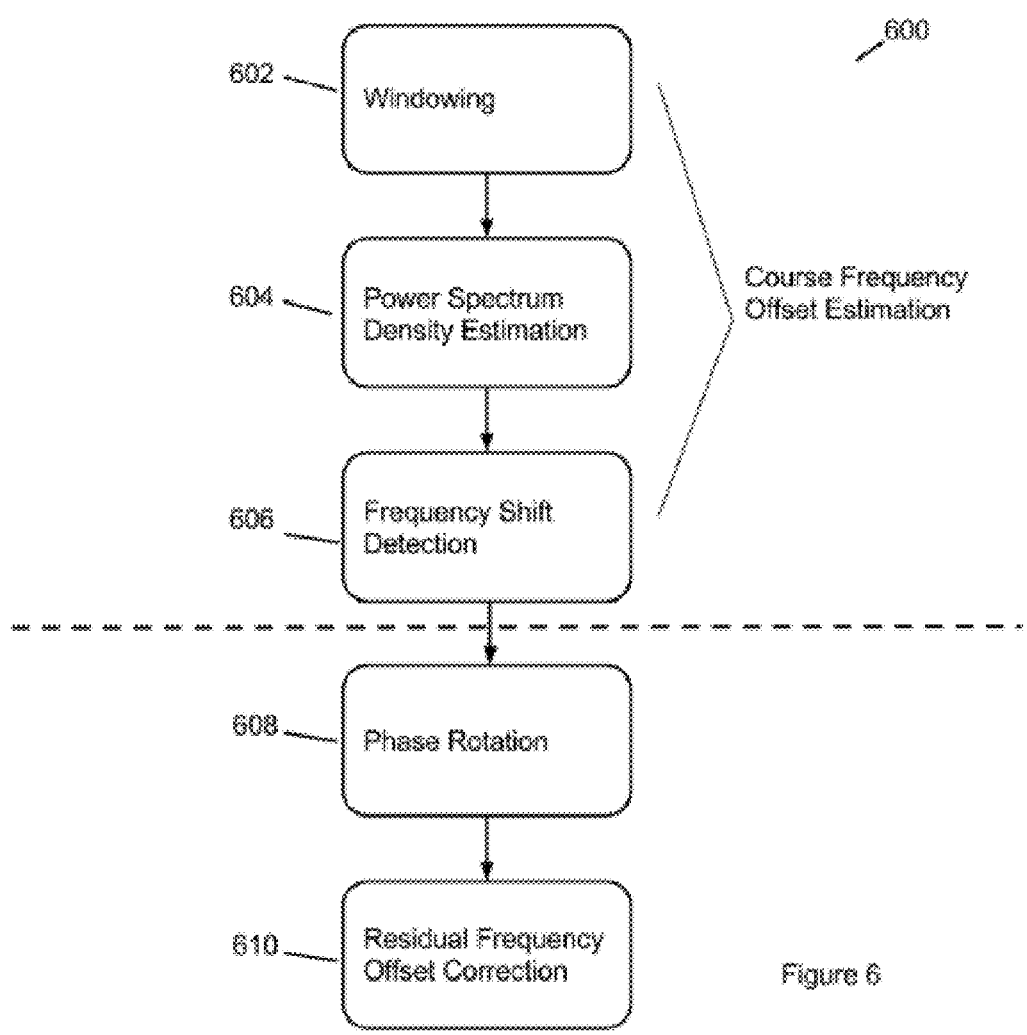
FIG. 6 is method of the pre-processing technique according to one embodiment of the invention.

Referring now to FIG. 6, method 600 for implementing the coarse carrier offset correction is shown. The coarse frequency offset estimation may be done in three stages: windowing 602, power spectrum estimation 604, and frequency shift detection 606. This is then followed by phase rotation/correction 608 and residual frequency offset correction 610.

At 602, data samples are tapered with a smoothing window function of length equal to the FFT size before performing an FFT. However when data samples are formed by concatenating shorter sequences, applying a single FFT window to the entire data collection may not be effective in reducing the side lobes.

Figure 7:
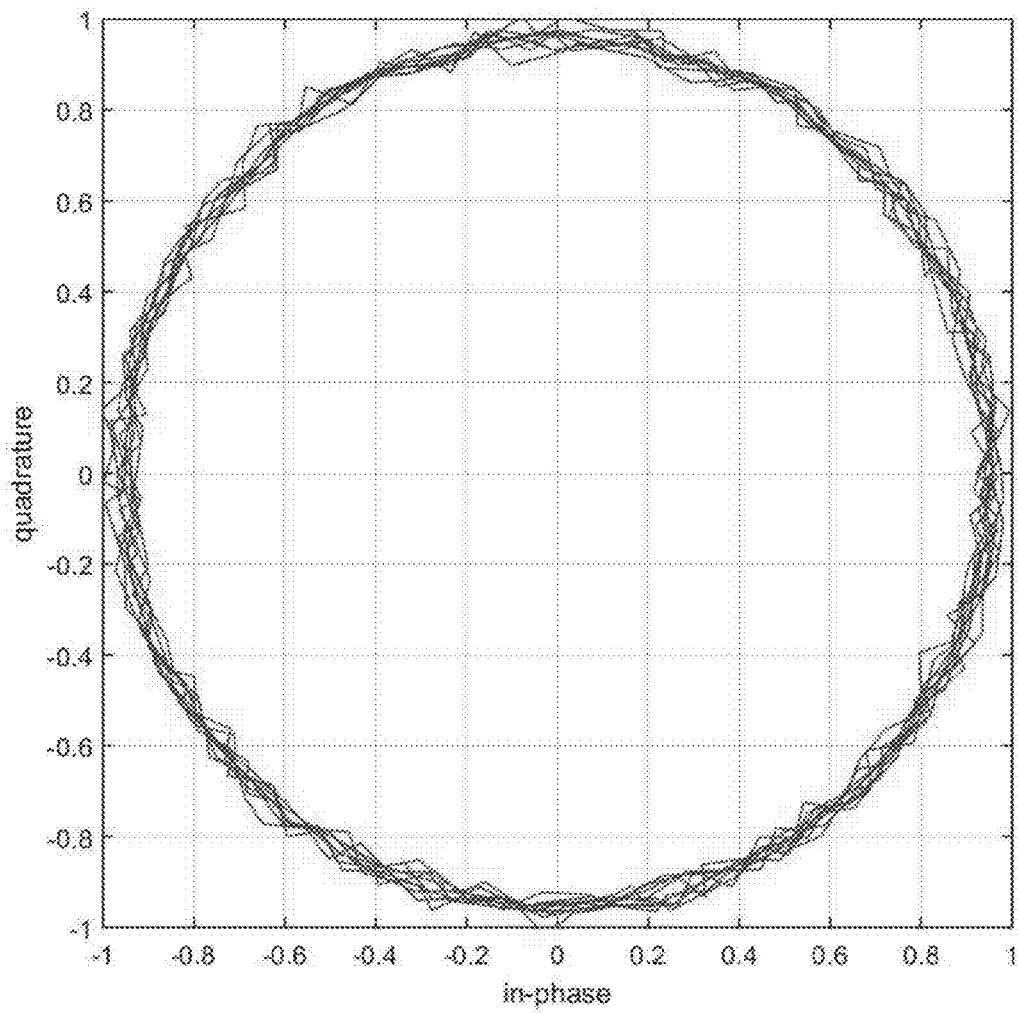
FIG. 7 shows the application of a window function to individual frames for non-contiguous observations.

In the preferred embodiment of this invention, a window function is applied to each individual frame of non-contiguous observations, which may suppress sudden amplitude changes at the frame edges. This is different than the conventional approach of applying a single window to the entire collection of data samples, as can be seen in FIG. 7, and may overcome the above problem of effectively reducing side lobes.

At 606 the frequency shift from the center may be estimated by calculating the difference between two sidebands of the spectrum. Captured signals may then be shifted in frequency by an amount equal to the estimated frequency offset. This process leaves a residual offset which needs to be compensated by a fine-frequency offset correction algorithm.

Phase Correction/Phase Rotation

At 608, before removing residual frequency offset, phase jumps at frame transitions may need to be smoothed. In the preferred embodiment of this invention, this may be accomplished by rotating phases of each sample in a frame such that leading and trailing samples of two neighboring frames have the same phase. This can be represented mathematically as follows:

$$y(n) = x(n)e^{-j\Phi\left(\left\lfloor \frac{n}{w+1} \right\rfloor + 1\right)}$$

and the phase correction to be applied to frame (k+1) is $\Phi(k+1)$ and $\Phi(k+1)$ is given by $$\Phi(k+1) = \Phi(k) + \phi(kw+1) - \phi(kw)$$

where $\lfloor \ \rfloor$ is the floor operator that maps its argument to the largest integer less than or equal to the argument, n=1, ..., N and N=mw is the total number of samples in m frames, w is the length of each non-contiguous frame, k=1, ..., m is the frame number, $$\varphi(\cdot) = \tan^{-1}\left(\frac{\operatorname{Im}(x(\cdot))}{\operatorname{Re}(x(\cdot))}\right)$$

is the phase angle of sample x(.) and m is the total number of concatenated frames.

Figure 8:
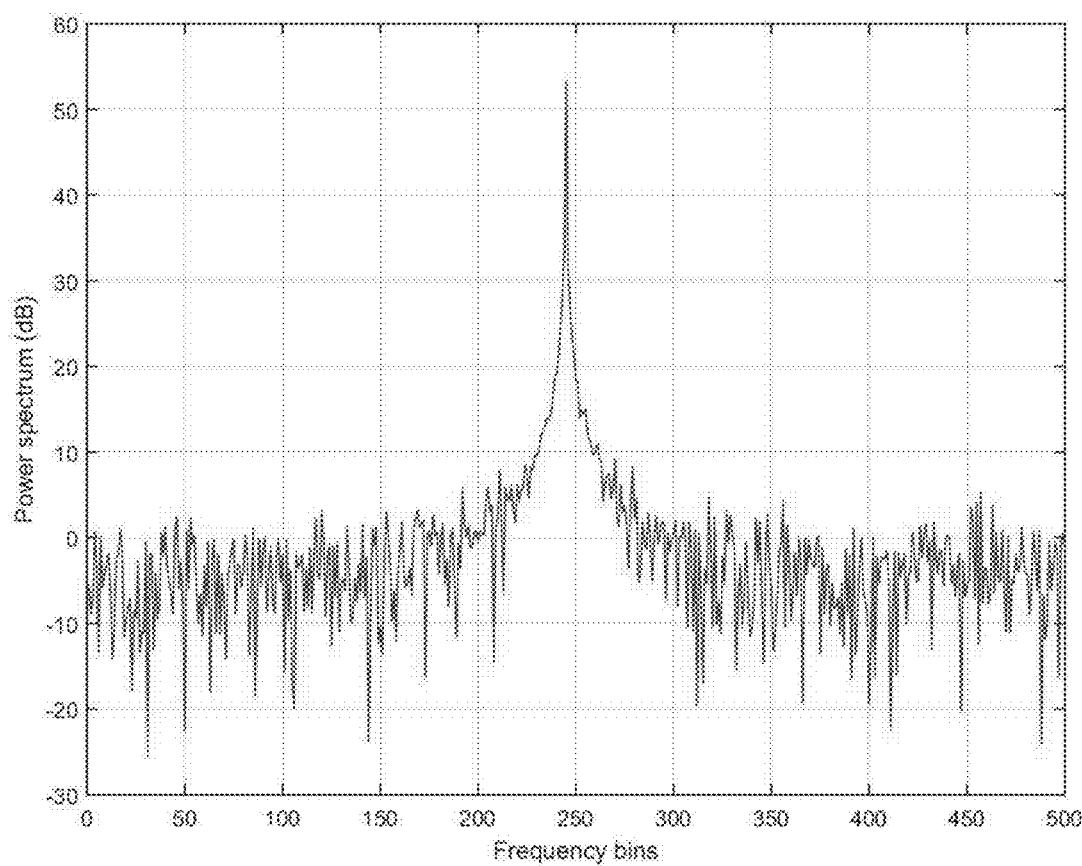
FIG. 8 shows the complex (in-phase and quadrature) samples after processing the signal in FIG. 2 using the phase correction algorithm (cords are removed)

Referring now to FIG. 8, this image shows a phase rotated non-contiguous signal in its phase space by using the technique described herein. As may be seen in this figure, sudden jumps resulting from acquisition interruptions shown in FIG. 2 may be successfully removed.

Figure 9:
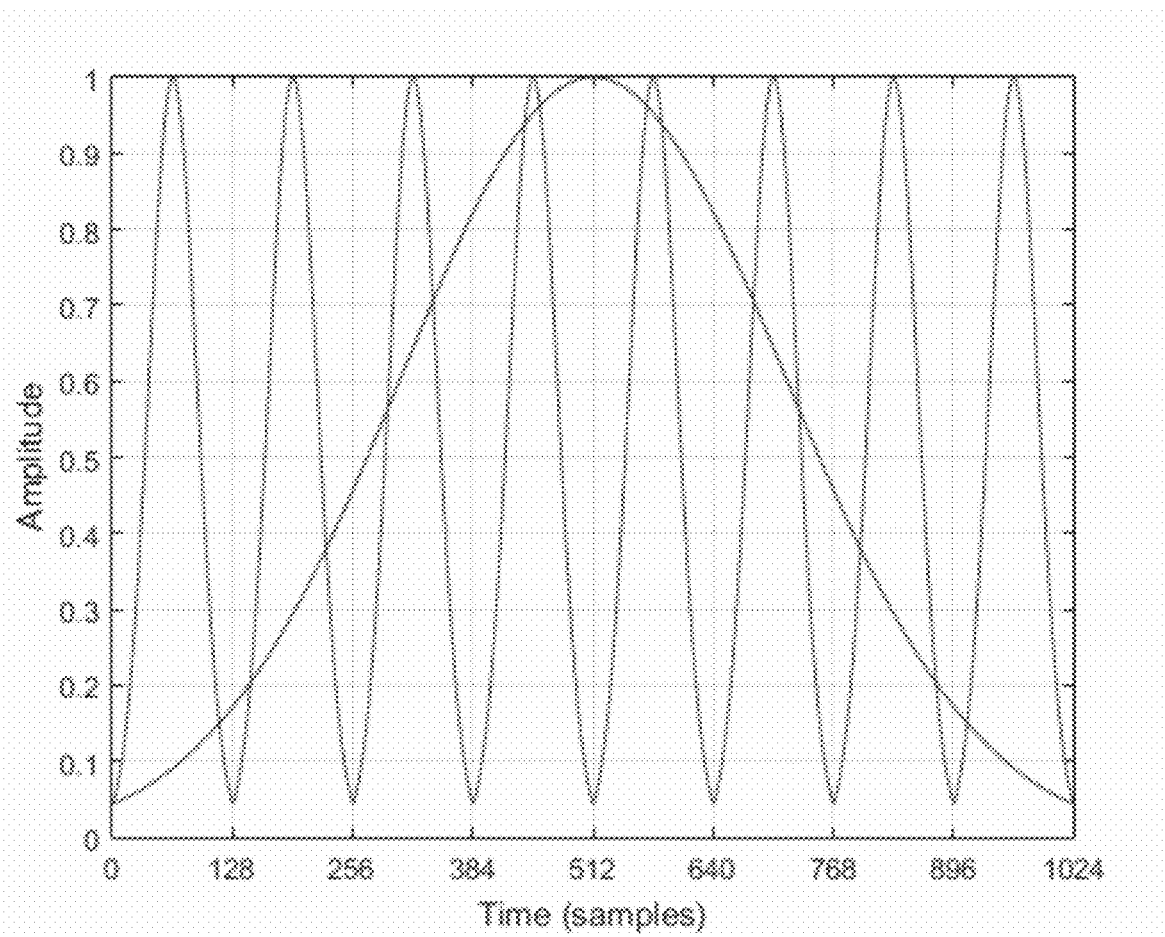
FIG. 9 shows a power spectrum of the signal displayed in Figure (spurs and sidelobes are suppressed significantly)

Referring now to FIG. 9, the corresponding power spectra of this signal is shown, where it may have achieved significant sideband suppression compared to the spectra shown in FIG. 3.

Residual Frequency Offset Correction

At 610, the residual frequency offset may be removed by using a higher resolution FFT. Because a large sidelobe suppression may be achieved by the phase rotation algorithm described herein, the residual frequency offset can be estimated using the maximum peak location in the high resolution FFT. This offset may then be removed by shifting the spectra and the resulting pre-processed signal may then be injected to the AMR unit for the classification decision.

Example Experiments

An example test bed was set up to evaluate the performance of the technique described herein. The test bed included a signal generator capable of generating various modulation formats and a receiver to capture generated signals. Preprocessing and classification algorithms were implemented in software.

In order to test the classification performance of the system in high SNR, CW, AM, 2FSK, 4FSK, MSK, BPSK, QPSK, 8PSK, PI/4QPSK and 16 QAM modulated signals were used. One hundred signals from each modulation type were captured and applied to the system. Referring now to FIG. 10, the first column shows input signal type applied to the system and the first row shows the output of the decision tree used for classification (as shown in FIG. 4). Note that CW and FSK are constant amplitude whereas AM and PSK are non-constant amplitude modulations (BPSK is considered to be non-constant due to pulse shaping introduced in the transmitter). Further branching down the decision tree is possible to differentiate among various PSK (BPSK, QPSK, etc) and QAM (16 QAM, 64 QAM, etc) modulations.

Figure 11:
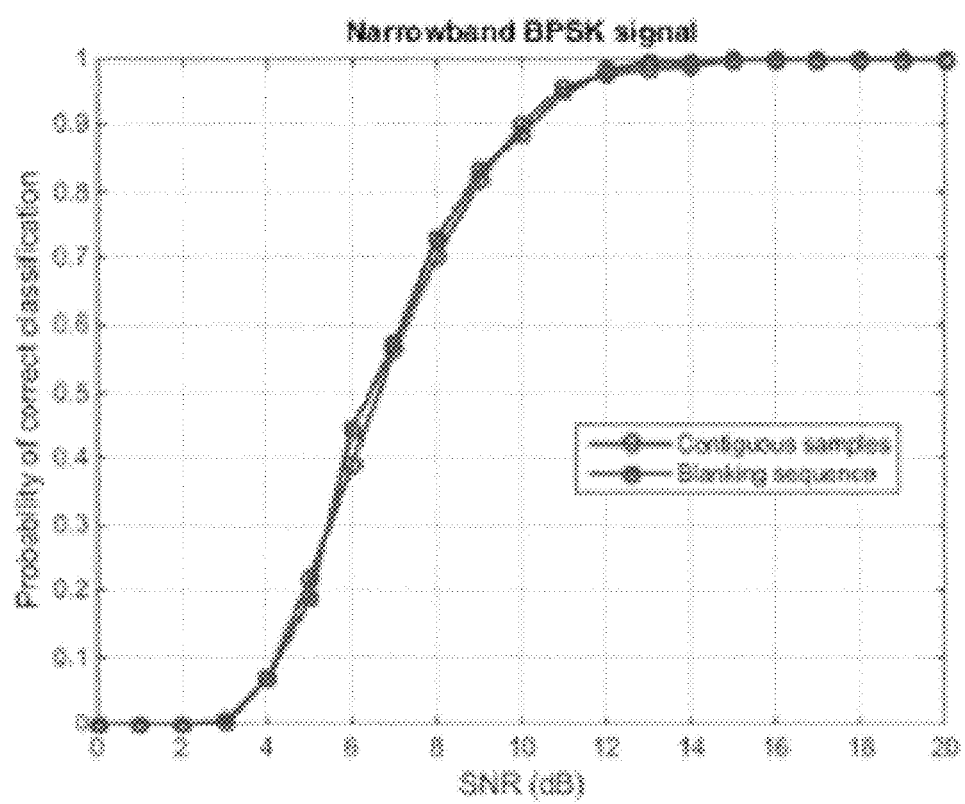
FIG. 11 is chart of example test data comparing modulation recognition systems working with contiguous and non-contiguous observations.

In order to evaluate low SNR performance of the technique described herein and compare the results to that of a system that works with contiguous observations, classification of BPSK signals were tested in an SNR range of 0 to 20 dB. Referring now to FIG. 11, the probability of correct classification is shown. In this figure it is seen that there is no difference in between the performances of the system that works with contiguous samples and the system using the technique described herein that works with non-contiguous observations.

This concludes the descriptions of the preferred embodiments. The description should be understood as illustrative of the invention, but should not be considered as limiting the invention, which is limited by solely by the claims which now follow.

The invention claimed is:

1. A signal classifying unit comprising
   a processor;
   a signal receiver for receiving and recording a radio-frequency signal; wherein said receiver is interruptible such that segments of the recorded radio-frequency signal are non-contiguous segments;
   a medium storing instructions executable by the processor for simulating contiguous segments by modeling said non-contiguous segments;
   wherein said instructions include instructions to:
   apply a coarse carrier frequency offset correction to said non-contiguous segments;
   apply a phase correction to said non-contiguous segments after said coarse carrier frequency offset correction is applied;
   apply a residual course frequency offset correction to said non-contiguous segments after said phase correction is applied to generate modeled contiguous segments; and,
   output a simulated continuous signal consisting of recorded continuous signal segments and modeled contiguous segments;
   a signal classifier receiving the outputted simulated continuous signal for classifying the simulated continuous signal.

2. A signal classifying unit according to claim 1, wherein said coarse carrier frequency offset correction comprises a windowing algorithm, a power spectrum estimation algorithm and a frequency shift detection algorithm.

3. A signal classifying unit according to claim 2, wherein said windowing algorithm applies a window function to each frame of the non-contiguous segments to suppress sudden amplitude changes at frame edges.

4. A signal classifying unit according to claim 3, wherein said phase correction comprises an algorithm implementing the rotation of phases of each sample in a frame such that leading and trailing samples of adjacent frames have the same phase.

5. A signal classifying unit according to claim 4, wherein the algorithm implementing the phase correction calculates the phase rotated samples y(n) by the following formulae:

$$y(n) = x(n)e^{-j\Phi\left(\left\lfloor \frac{n}{w+1}+1\right\rfloor\right)}$$

where $\lfloor \ \rfloor$ is the floor operator that maps its argument to the largest integer less than or equal to the argument, x(n) is the input signal containing discontinuities, n=1, . . . , N and N=mw is the total number of samples in m frames, w is the length of each non-contiguous frame, the phase correction to be applied to frame (k+1) is $\Phi$(k+1), which is computed by $$\Phi(k+1) = \Phi(k) + \phi(kw+1) - \phi(kw)$$

where k=1, . . . , m is the frame number, m is the total number of concatenated frames and $$\varphi(\cdot) = \tan^{-1}\left(\frac{\text{Im}(x(\cdot))}{\text{Re}(x(\cdot))}\right)$$

is the phase angle of sample x(.) and $\Phi(1)=\phi(1)$ by definition.

6. A signal classifying unit according to claim 5, wherein the residual coarse frequency offset is estimated using phase rotated samples.

7. A method for pre-processing a signal prior to classification, where the signal includes non-contiguous segments; the method comprising:
receiving and recording a radio-frequency signal by a signal receiver; wherein said receiver is interruptible such that segments of the recorded radio-frequency signal are non-contiguous segments;
applying by a computer processor a coarse carrier frequency offset correction to said non-contiguous segments;
applying by a computer processor a phase correction to said non-contiguous segments after the coarse carrier frequency offset correction is applied;
applying by a computer processor a residual course frequency offset correction to said non-contiguous segments after the phase correction is applied, to generate modeled contiguous segments; and,
outputting by a computer processor a simulated continuous signal consisting of recorded continuous signal segments and modeled contiguous segments.

8. A method according to claim 7, wherein said coarse carrier frequency offset correction comprises a windowing algorithm, a power spectrum estimation algorithm and a frequency shift detection algorithm.

9. A method according to claim 8, wherein said windowing algorithm applies a taper function to each frame of the non-contiguous segments to suppress sudden amplitude changes at frame edges.

10. A method according to claim 9, wherein said phase correction comprises an algorithm implementing the rotation of phases of each sample in a frame such that leading and trailing samples of adjacent frames have the same phase.

11. A method according to claim 10, wherein the algorithm implementing the phase correction calculates the phase rotated samples y(n) by the following formulae:

$$y(n) = x(n)e^{-j\Phi\left(\left\lfloor \frac{n}{w+1}+1\right\rfloor\right)}$$

where $\lfloor \ \rfloor$ is the floor operator that maps its argument to the largest integer less than or equal to the argument, x(n) is the input signal containing discontinuities, n=1, . . . , N and N=mw is the total number of samples in m frames, w is the length of each non-contiguous frame, the phase correction to be applied to frame (k+1) is $\Phi$(k+1), which is computed by:

$$\Phi(k+1) = \Phi(k) + \phi(kw+1) - \phi(kw)$$

where k=1, . . . , m is the frame number, m is the total number of concatenated frames and $$\varphi(\cdot) = \tan^{-1}\left(\frac{\text{Im}(x(\cdot))}{\text{Re}(x(\cdot))}\right)$$

is the phase angle of sample x(.) and $\Phi(1)=\phi(1)$ by definition.

12. A method according to claim 11, wherein the residual course frequency offset is estimated using phase rotated samples.

* * * * *